US006947540B2

(12) United States Patent
Madoch et al.

(10) Patent No.: US 6,947,540 B2
(45) Date of Patent: *Sep. 20, 2005

(54) METHOD AND NETWORK FOR PROVIDING ACCESS TO AN INFORMATION NETWORK

(75) Inventors: Pitsa Madoch, Glenview, IL (US); Richard Peter Ericson, Park Forest, IL (US); Robert John Laitman, LaGrange, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/376,472

(22) Filed: Feb. 28, 2003

(65) Prior Publication Data

US 2003/0133559 A1 Jul. 17, 2003

Related U.S. Application Data

(63) Continuation of application No. 09/382,913, filed on Aug. 25, 1999.

(51) Int. Cl.[7] .......................... H04M 7/00; H04L 12/66
(52) U.S. Cl. .................... 379/220.01; 370/352
(58) Field of Search ............... 379/221.15, 207.02, 379/229, 230, 219, 220.01, 221.01; 370/352, 538, 540; 709/203

(56) References Cited

U.S. PATENT DOCUMENTS

| | | | | |
|---|---|---|---|---|
| 5,436,957 A | * | 7/1995 | McConnell | 379/196 |
| 5,539,817 A | * | 7/1996 | Wilkes | 379/230 |
| 5,790,548 A | * | 8/1998 | Sistanizadeh et al. | 370/401 |
| 5,917,899 A | * | 6/1999 | Moss et al. | 379/221.08 |
| 5,933,490 A | * | 8/1999 | White et al. | 379/221.01 |

* cited by examiner

Primary Examiner—Benny Tieu
(74) Attorney, Agent, or Firm—Law Office of Dale B. Hailing

(57) ABSTRACT

An intelligent network for providing access to an information network (80) has a number of central office switches (64, 82). Each central office switch (64, 82) is capable of receiving a call to a centrex telephone number and transmitting a query. A service control point (70) is coupled to the central office switches (64, 82) by a SS7 signal link (66). The service control point receives the query and transmits a response to the central office switch (64, 82). A hub switch (75) is coupled to the central office switches (64, 82) and receives the call. The hub switch (75) contains a digital trunk service (76) that combines the call with a number of other calls to form a data stream. The data stream is then transmitted to an information network node (80).

9 Claims, 8 Drawing Sheets

METHOD AND NETWORK FOR PROVIDING ACCESS TO AN INFORMATION NETWORK

RELATED APPLICATIONS

The present application is a continuation of application Ser. No. 09/382,913, filed Aug. 25, 1999 assigned to the same assignee as the present application.

FIELD OF THE INVENTION

The present invention relates generally to the field of telecommunications and more particularly to a method and network for providing access to an information network.

BACKGROUND OF THE INVENTION

Information and Enhanced Service Providers (ISP/ESP) provide access to computer networks and information services, such as real estate listings. A small customer, such as an individual, contracts with an ISP (or ESP) to provide access to the internet or other information service. The customer has his modem call the ISP's telephone number. The customer's modem then establishes a communication link over the public switched telephone network with the ISP's modem. Once the communication link has been established, the ISP can connect the customer to electronic mail services, the world wide web and a variety of other services.

Internet Service Providers (ISP) require a large number of incoming telephone lines for their customers (subscribers). Today ISPs generally create a number of mini-points of presence (POPs) that can terminate a large number of telephone calls. Terminating equipment must be purchased for a number of locations. Customer calls to the ISP are routed to one of the mini-POPs and terminating by the terminating equipment. The terminating equipment is expensive and must be maintained by the ISP. In addition, if the ISP wishes to increase the number of incoming lines, this requires the purchase of additional terminating equipment.

Thus there exists a need for a method and network that overcomes these and other problems.

DETAILED DESCRIPTION OF THE DRAWINGS

Figure 1:
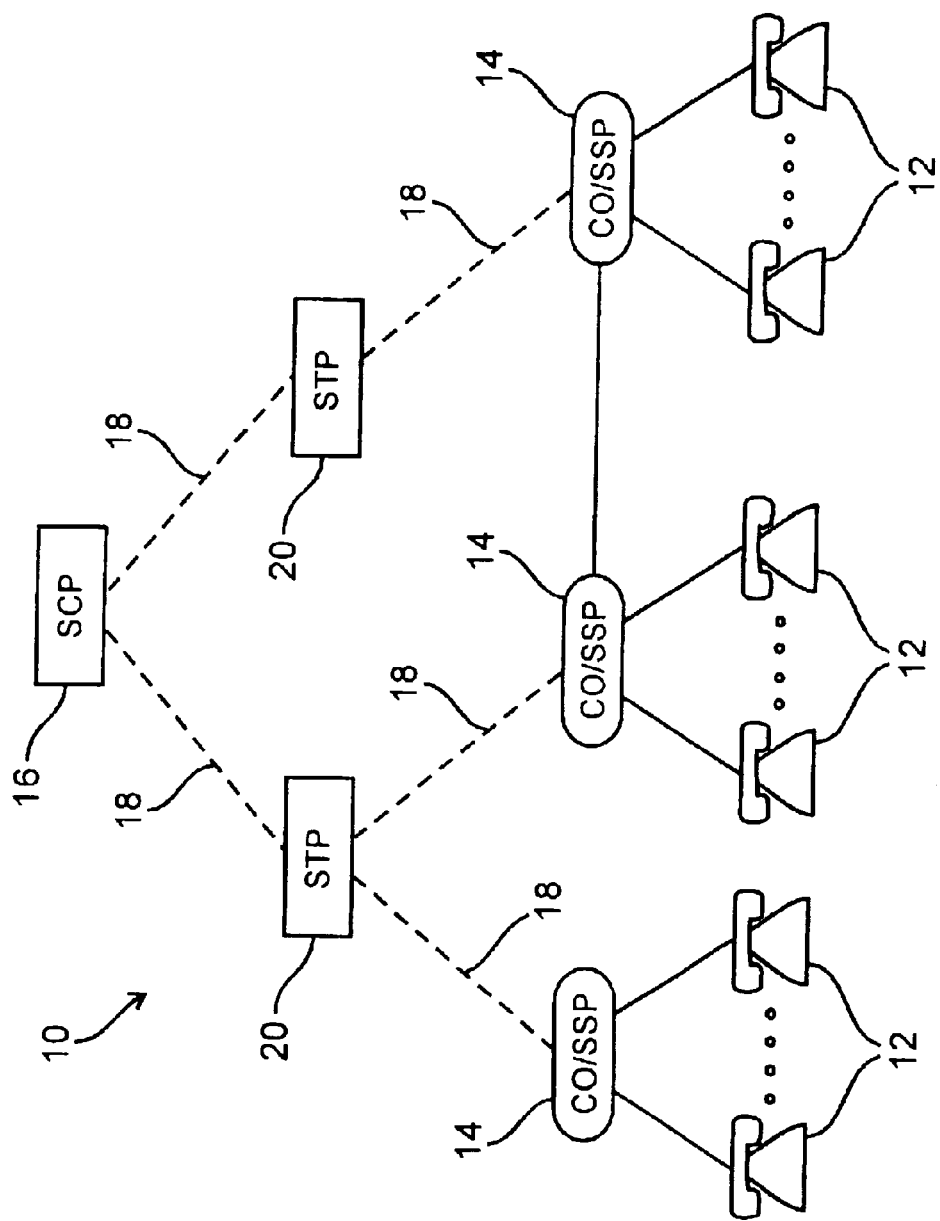
FIG. 1 is a block diagram of an advanced intelligent network.

The invention uses some of the features of an advance intelligent network to provide the ISP the functionality of a mini-POP without the cost and maintenance problems of a mini-POP. A brief discussion of the advanced intelligent network 10, shown in FIG. 1, will be helpful in understanding the invention. The idea behind the advanced intelligent network 10 is to separate the "intelligent" features from the switching. A plurality of telephones 12 are connected to a plurality of central office—service switching points (CO\SSP) 14. A standard telephone call within an LATA (Local Access and Transport Area) is switched at a CO\SSP 14 to the appropriate destination, without any additional processing. A call invoking a special feature, such as incoming and out-going call control or caller ID with name, require processing by a service control point (SCP) 16. A SCP 16 is a computer and memory system that contains routing, billing and other information. Calls to a number having incoming call control are detected at the CO\SSP 14 as requiring additional processing. This is called a trigger, and call processing is interrupted while the CO\SSP 14 transmits a query to the SCP 16, requesting information on how to route the call. The query is carried over a signal system-7 (SS7) signal link 18 and routed to the appropriate SCP 16 by a signal transfer point (STP) 20. The STP 20 performs global title translation on the incoming query and routes the query to the appropriate SCP 16. Once the SCP 16 receives the query, it formulates a response containing the routing information, and transmits it to the requesting CO\SSP 14. The CO\SSP 14 then continues the call processing by switching the call to the appropriate destination.

Figure 2:
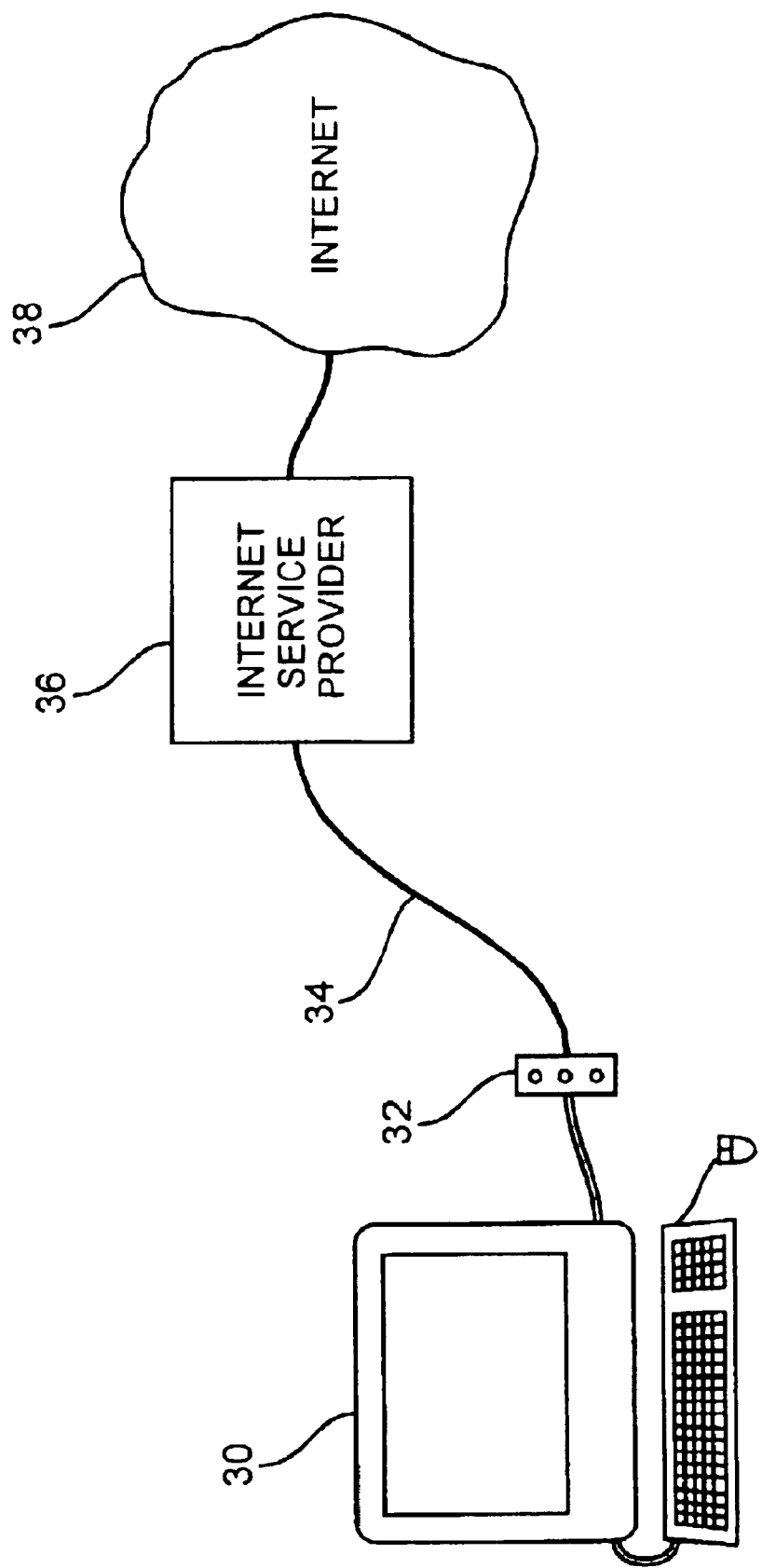
FIG. 2 is a schematic diagram of an computer network service connection.

FIG. 2 is a schematic diagram of an internet access system. An internet access system is one example an information network contemplated by the invention. Other examples include a centralized customer answering service and an automated real estate listing service. A customer uses communication software on his computer 30 to direct his modem 32 to establish a communication link. The communication link uses a standard telephone line 34 or ISDN line connecting the customer's modem 32 to an internet service provider (information provider) 36. Once the communication link is established the internet service provider 36 provides the customer access to the internet 38. The customer can then connect to services such as electronic mail, newsgroups and the world wide web.

Figure 3:
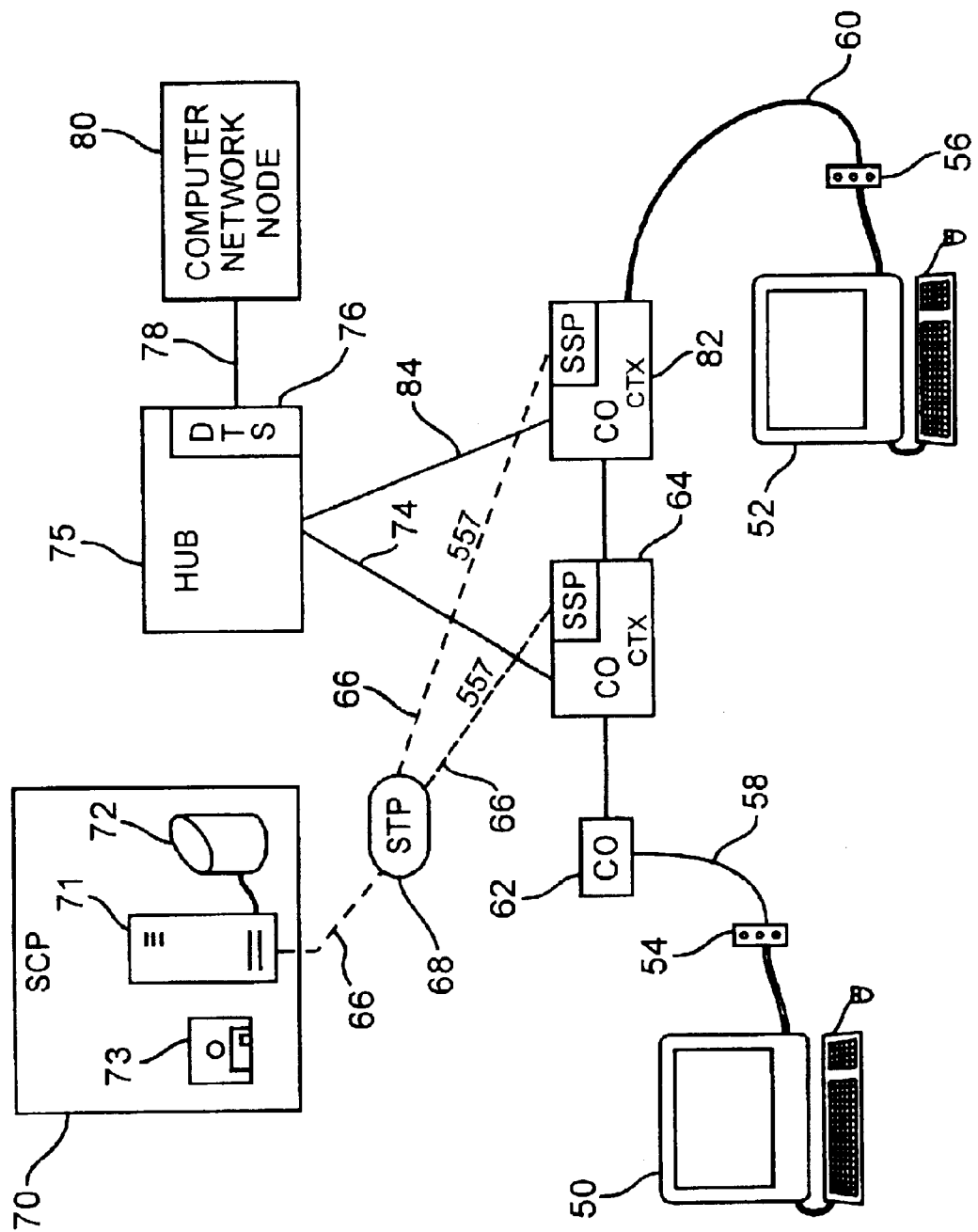
FIG. 3 is a block diagram of a network for providing access to an information network node.

FIG. 3 is a block diagram of an intelligent network for providing access to a computer network node (e.g., internet, AOL). A computer 50, 52 has a modem 54, 56 connected to a telephone line 58, 60. When the modem 54 calls a centrex (ctx) telephone number belonging to the ISP, a central office switch 62 connects the modem 54 to a second central office switch (plurality of central office switches) 64 having the centrex telephone number. The second central office switch 64 is a SSP and upon receiving a call to one of the plurality of centrex telephone numbers, the SSP interrupts call processing and launches a query. The query is routed by a signal system 7 (SS7) 66 to a STP 68. The STP 68 routes the query to a SCP 70. The SCP 70 transmits a response to the CO\SSP 64 that contains a routing instruction and a billing instruction. The SCP 70 is a large computer 71 having a large memory 72 that contains routing, billing and other special instructions. The SCP 70 can be programmed to provide a variety of services. A computer-readable storage medium (hard drive, tape drive, etc.) 73 can be used to store programs (computer-readable instructions) to implement various services by the SCP, such as the service of this invention.

The routing instruction causes the CO\SSP 64 to forward the call along one of a plurality of call forwarding paths 74 to a hub switch 75. The hub switch 75 includes a digital trunking service (DTS) 76 that combines the forwarded call with a plurality of other calls to the plurality of centrex numbers to form a data stream. The digital trunking service 76 formats the data in a twenty four channel 1.544 Mbps format or an Integrated Services Digital Network (ISDN) primary rate interface service format. The hub switch also measures the usage (centum call seconds, line-time usage) of the data stream. The data stream is carried by a dedicated trunk 78 to the computer network node (information network node) 80. For an internet provider the computer network node (computer network access node) 80, would be the ISP's internet access point. In another embodiment, the computer 52 calls one of the plurality of centrex numbers selected by the ISP. The modem 56 establishes a communication link with CO\SSP 82 without having to switch through another CO. The CO\SSP 82 performs the same functions as the CO\SSP 64 and forwards the call to the hub over a digital trunk 84 that connects the hub switch to the CO\SSP 82.

Figure 4:
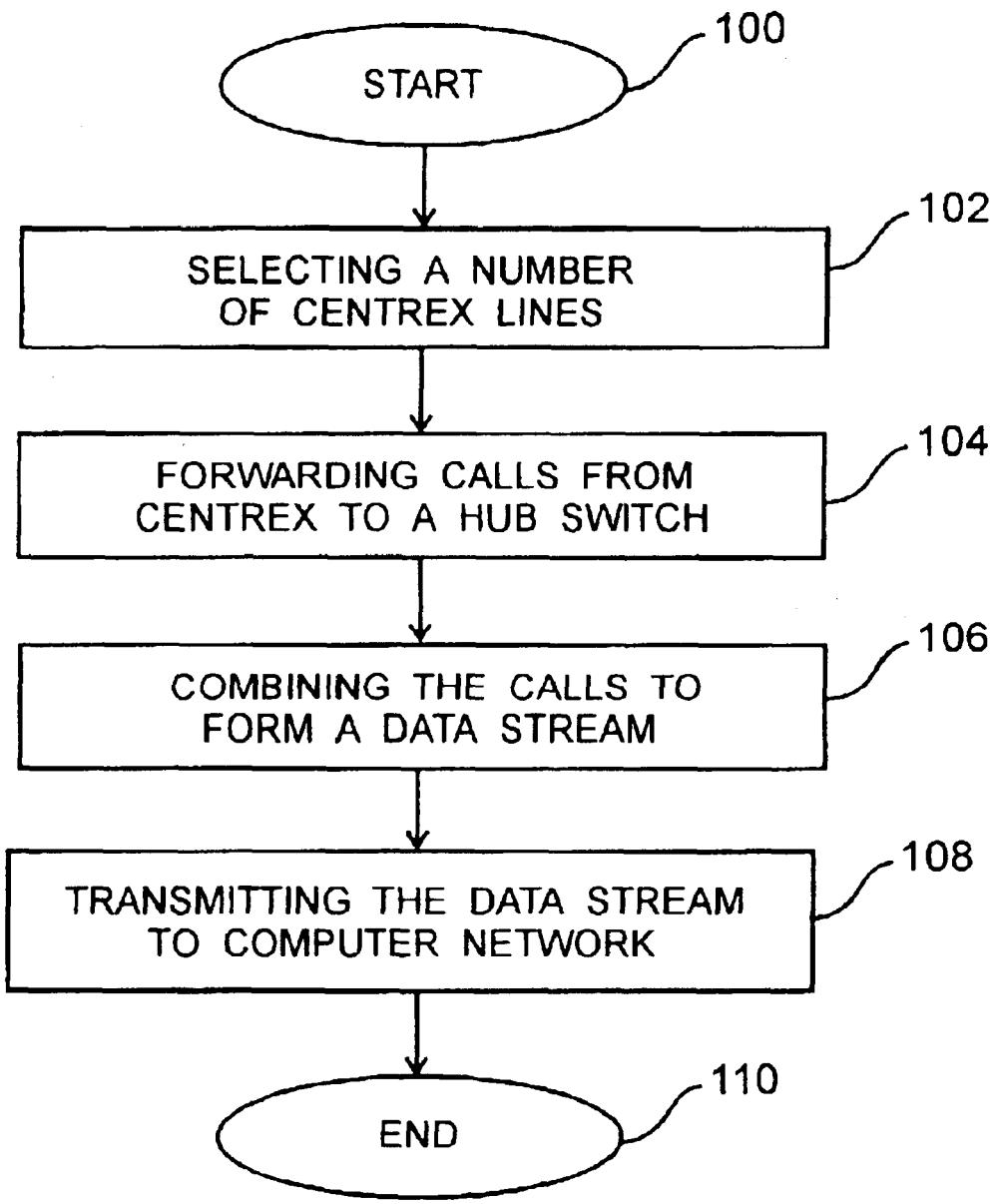
FIG. 4 is a flow chart of an embodiment of a method of providing access to a computer network.

FIG. 4 is a flow chart of an embodiment of the process implemented by the intelligent network of FIG. 3. The process starts, step 100, by selecting a number of centrex lines (centrex numbers) at step 102. These centrex numbers are the numbers an ISP's customers call to obtain access to the ISP/internet. A plurality of calls to one of the plurality of centrex numbers are forwarded to the hub switch at step 104. The call is then combined with a plurality of other calls to the plurality of centrex numbers to form a data stream at step 106. The data stream is transmitted over a dedicated trunk to a computer network (information network), at step 108, which ends the process at step 110.

Figure 5:
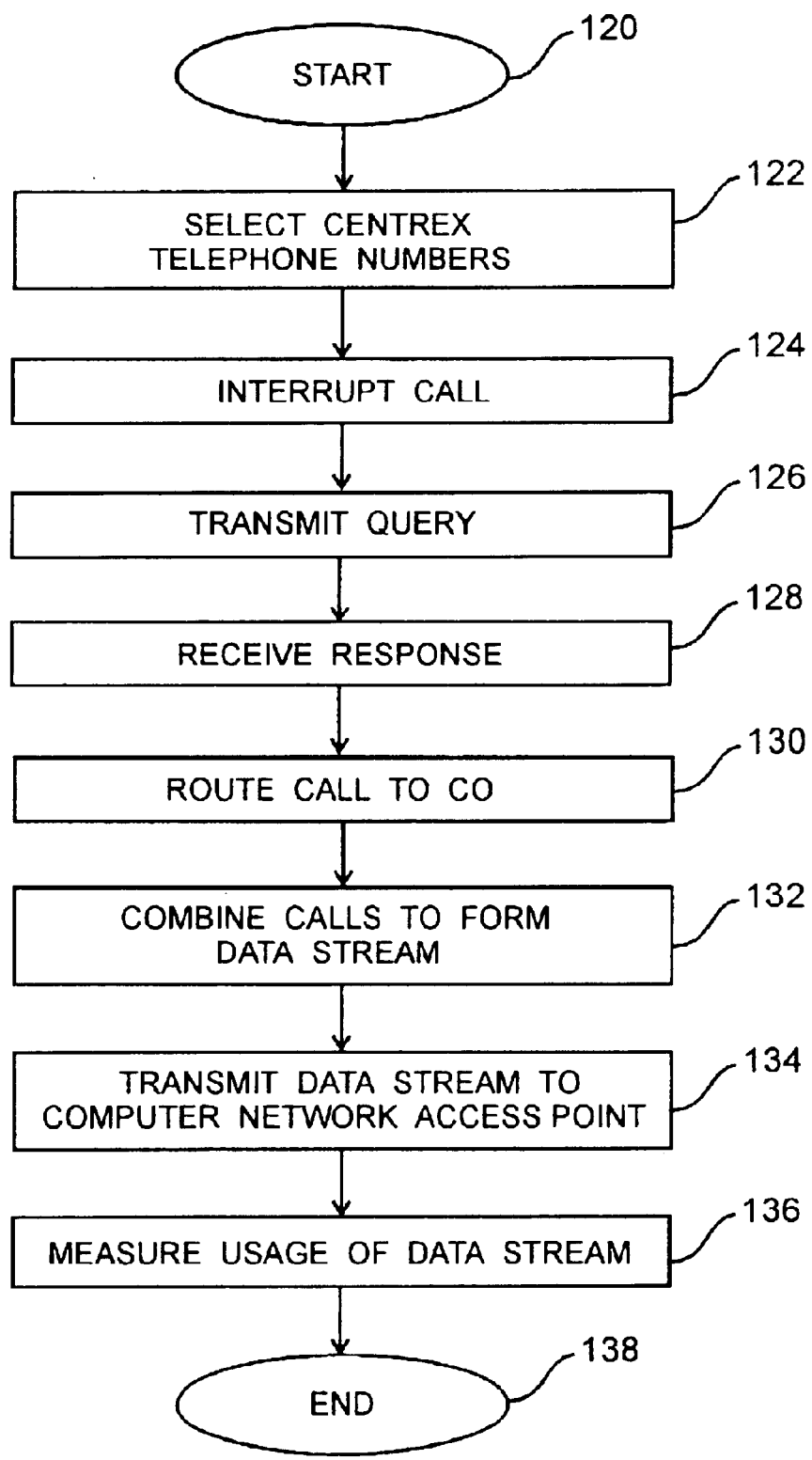
FIG. 5 is a flow chart of another embodiment of a method of providing access to a computer network.

FIG. 5 is another embodiment of the process of providing access to a computer network. This process can be embodied in a software program that is executed by the intelligent network. The process starts, step 120, by selecting a plurality of centrex lines (numbers) at step 122. A call to one of the plurality of centrex numbers is interrupted by the CO\SSP at step 124. A query is transmitted from the CO\SSP to a SCP at step 126. A response is received from the SCP at step 128. The response includes a routing instruction and a billing instruction. At step 130 the call is routed to the hub switch based on the routing instruction. A digital trunking service at the hub switch combines the call with a plurality of other calls to form a data stream at step 132. The data stream is transmitted to a computer network access node (information network access node) at step 134. The usage of the data stream is measured according to the billing instruction at step 136, which ends the process at step 138.

Figure 6A:
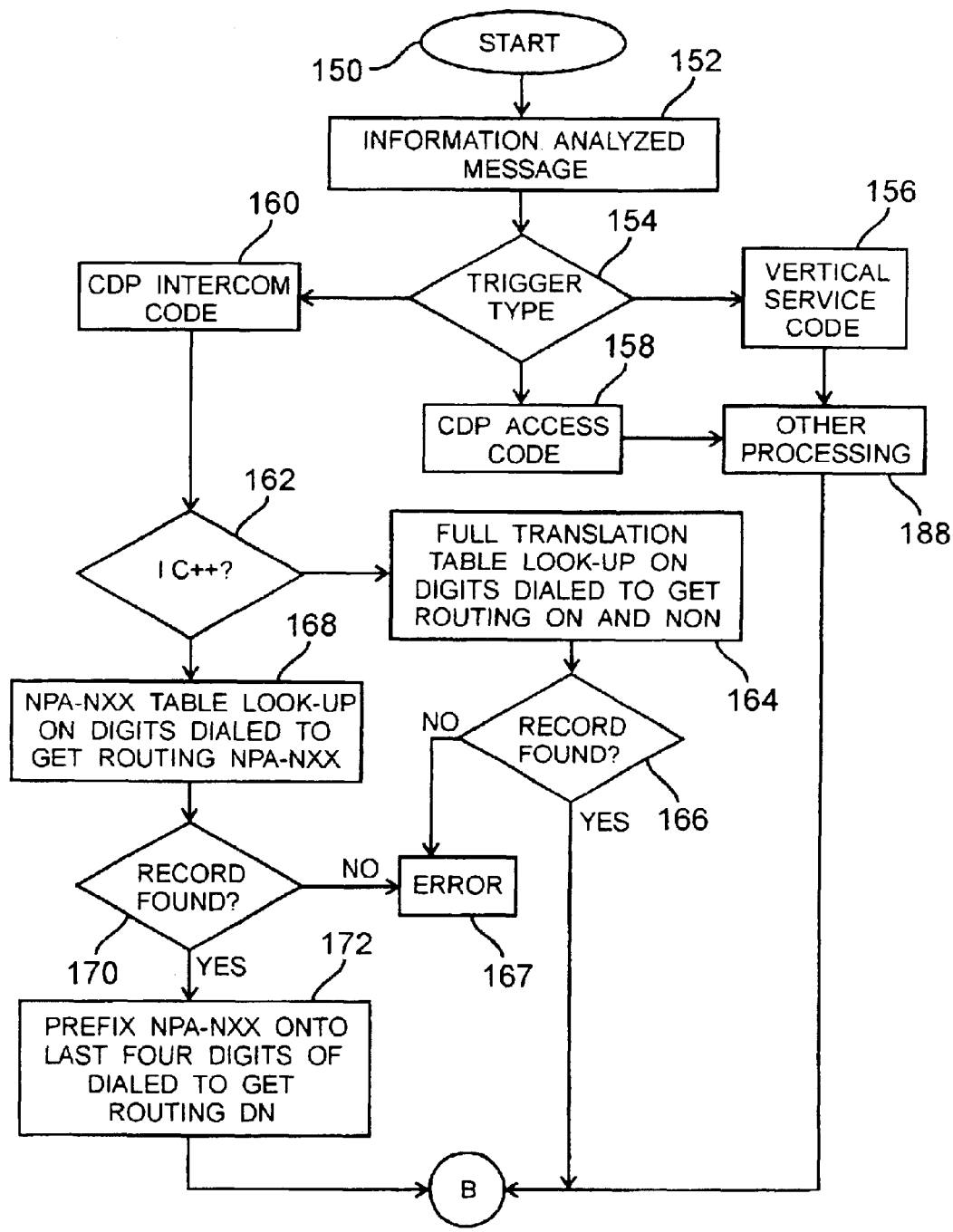
FIGS. 6a–c are a flow chart of the steps a service control point executes to generate a response.
Figure 6B:
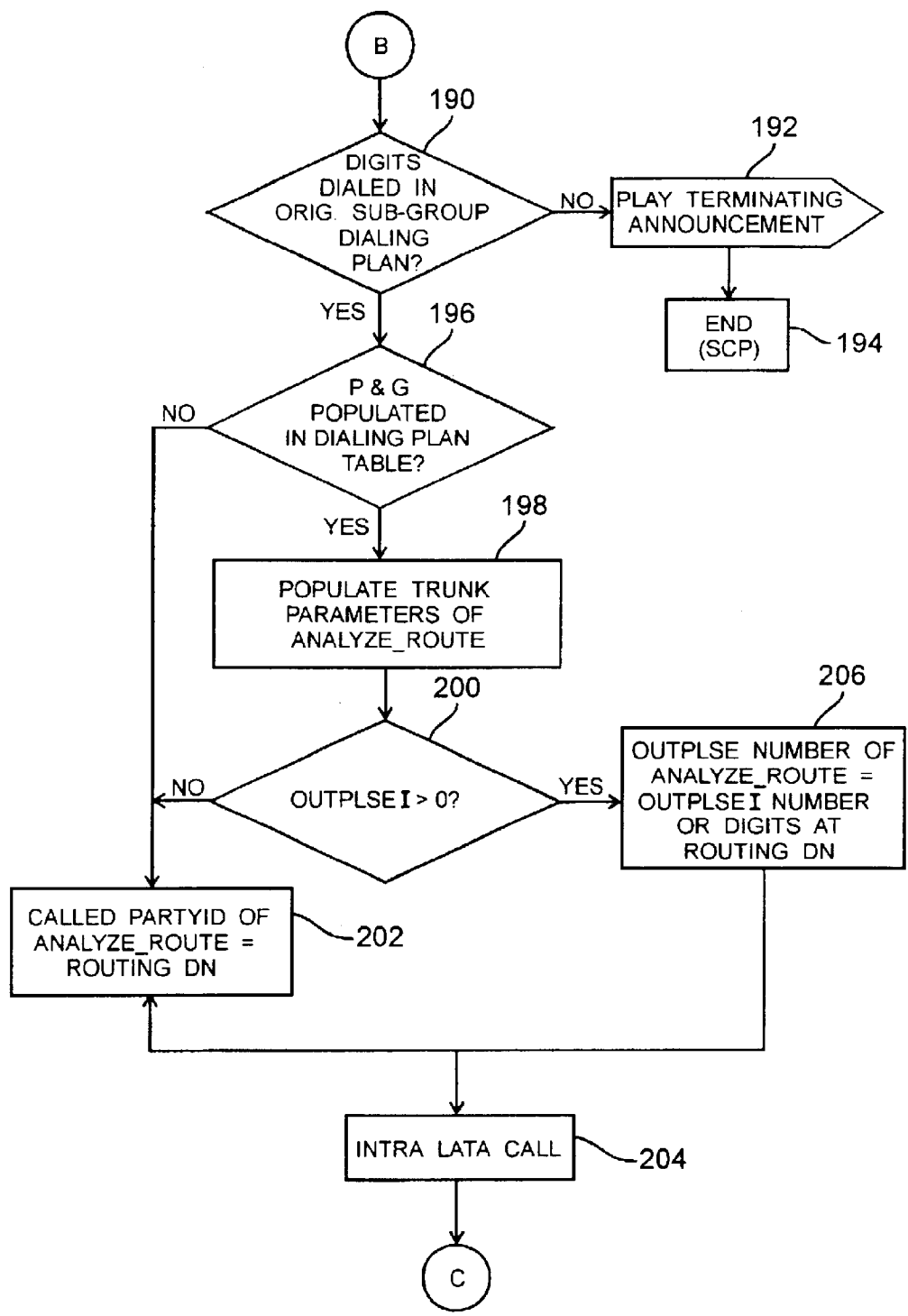
Figure 6C:
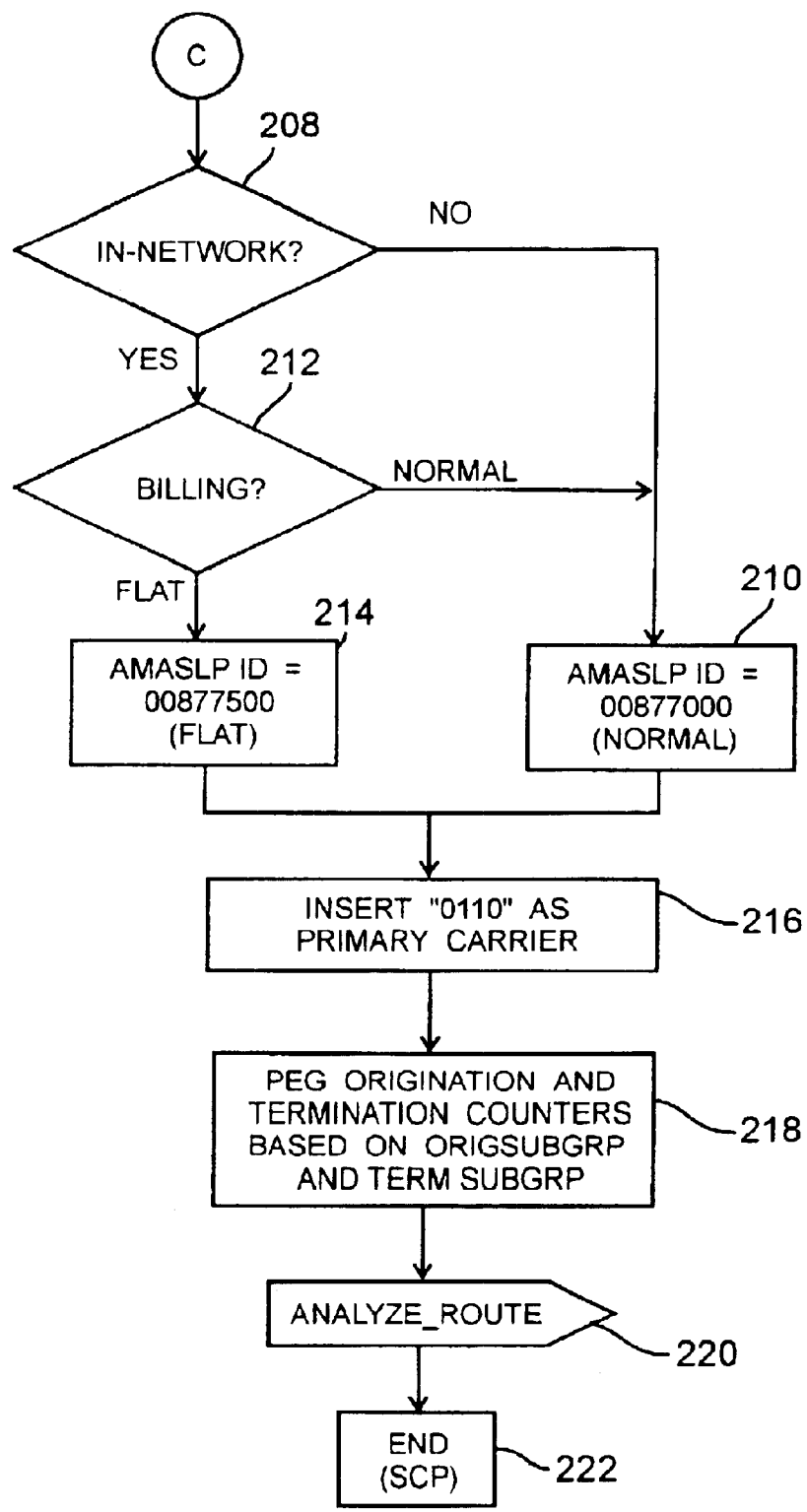

FIGS. 6a–c are a flow chart of the steps a service control point executes to generate a response. The process starts, step 150 (FIG. 6a), after the call has been routed from the seven digit centrex number in the SSP to an abbreviated number. The SSP triggers on the abbreviated number and transmits an "information analyzed message", which is received by the switching control point (SCP) at step 152. The SCP then determines the trigger type at step 154. The vertical service code of step 156 and the CDP (custom dialing plan) access code of step 158 are not the preferred trigger codes for this service. The CDP intercom code of step 160 is the preferred code. Next, it is determined at step 162 if the translation table to be used is a full translation table or the north American plan (NPA-NXX) translation table. When the parameter "ICtt" is a zero the full translation table is used at step 164 to get the routing destination number (DN) and the Nature of the number (NoN). The DN is a seven to 12 digit national or international number. The NoN indicates whether the number is national or international. Next it is determined if the record was found at step 166. When the record is not found at step 166, an error has occurred, step 167. When the record is found at step 166 the processing continues at B on FIG. 6b.

When the parameter "ICtt", at step 162 is a one the North American Number Plan (NPA-NXX) table is used at step 168 to get the routing NPA-NXX number. When the record is not found at step 170, an error has occurred. When the record is found at step 170, the NPA-NXX number is prefixed onto the last four digits dialed to get the routing DN, at step 172. Processing then continues at B on FIG. 6b.

Once the other processing of step 188 (FIG. 6a) is preformed or the record is found processing continues on FIG. 6b. At step 190 it is determined if the digits dialed belong to the original subgroup dialing plan. When the digits dialed do not belong to the original subgroup dialing plan, the SCP sends a play terminating announcement to the SSP at step 192, which ends the SCP processing at step 194. This will only occur if there is an error. The originating subgroup plan is defined by the terminating centrex number in SSP and the digits dialed is defined by the abbreviated number to which the call is routed by the SSP. When the digits dialed belong to the original subgroup dialing plan, a primary trunk group can be defined at step 196 and the process then performs steps 198, 200 and 206. For this service the primary trunk group is not defined. When the primary trunk group is not defined at step 196, then the called party ID of the analyze route message is set equal to the routing DN at step 202. Next it is determined that the call is an intra-LATA (Local Access and Transport Area) at step 204.

Next, it is determined (FIG. 6c) if the call is in-network at step 208. For this service the call is always in network. Next, it is determined which type of billing has been specified for the customer at step 212. When the billing is normal rater, the billing parameter is set for normal at step 210. When the billing is flat rate, the billing parameter is set for flat rate at step 214. Once the billing parameter has been set, the primary carrier parameter is set at step 216. At step 218, the origination and termination counters based on origination subgroup and termination subgroup are updated. This allows the ISP to determine where the calls are coming from and which facilities are servicing them. The analyze route message is then transmitted to the SSP at step 220, which ends the processing at step 222.

Using the process described above an ISP no longer needs to buy terminating equipment at a plurality of locations or to dedicate terminal equipment to support each site. A plurality of additional lines can be added by adding a single centrex number. Since the calls are routed to a hub switch and digital trunking service utilization improvements are realized through the hub\CO switch and the ISP no longer has to maintain equipment at multiple locations. Thus there has been described a network and method of providing access to a computer network, that reduces maintenance and capital costs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing access to an information network, comprising the steps of:
   a) receiving a plurality of calls initiated by a plurality of computers at a plurality of central offices;
   b) triggering on the plurality of calls; and
   c) forwarding the plurality of calls to a hub switch.
2. The method of claim 1, further including the steps of:
   d) combining the plurality of calls to form a data stream.
3. The method of claim 2, further including the steps of:
   e) transmitting the data stream to an information network access node.

4. The method of claim 1, wherein step (a) further includes the step of:

a1) coupling the plurality of computers to a plurality of modems.

5. The method of claim 1, wherein step (b) further includes the step of:

b1) transmitting a query to a service control point;

b2) receiving a response from the service control point;

b) routing one of the plurality of calls based on the response.

6. A method of providing access to an information network, comprising the steps of:

a) receiving a call from one of a plurality of centrex telephone numbers at a central office;

b) transmitting an information analyzed message to a service control point;

c) determining a trigger type at the service control point;

d) when the trigger type is a custom dialing plan access code, determining a destination number at the service control point;

e) routing the call to a hub switch; and f) aggregating the call with a plurality of calls to form a data stream.

7. The method of claim 6, further including the steps of:

g) transmitting the data stream to an information network access node.

8. The method of claim 6, wherein step (d) further includes the step of:

d1) transmitting the destination number to the central office.

9. The method of claim 6, wherein step (d) further includes the steps of:

d1) performing a look-up in a translation table;

d2) when a record cannot be found, determining an error has occurred.

* * * * *

UNITED STATES PATENT AND TRADEMARK OFFICE
CERTIFICATE OF CORRECTION

PATENT NO. : 6,947,540 B2  Page 1 of 1
APPLICATION NO. : 10/376472
DATED : September 20, 2005
INVENTOR(S) : Madoch et al.

It is certified that error appears in the above-identified patent and that said Letters Patent is hereby corrected as shown below:

Col. 1, lines 1-3: replace "The present application is a continuation of application Ser. No. 09/382,913, filed Aug. 25, 1999 assigned to the same assignee as the present application." with -- This patent is a continuation of U.S. Patent Application Serial No. 09/382,913, filed on August 25, 1999, now U.S. Patent No. 6,606,378, which is a continuation of U.S. Patent Application Serial No. 08/761,661, filed on December 6, 1996, now U.S. Patent No. 5,995,605. --

Signed and Sealed this

Sixteenth Day of November, 2010

David J. Kappos
*Director of the United States Patent and Trademark Office*